United States Patent
Lomax

(10) Patent No.: US 10,377,457 B2
(45) Date of Patent: Aug. 13, 2019

(54) CRAFT FOR USE ON A BODY OF WATER AND TRANSPORT AND CONTROL SYSTEM THEREFORE

(71) Applicant: INNORIAN RESEARCH & DEVELOPMENT LIMITED, Wakefield, Yorkshire (GB)

(72) Inventor: Stuart Lomax, Wakefield (GB)

(73) Assignee: Bod-Jet Global Limited, Wakefield (GB)

( * ) Notice: Subject to any disclaimer, the term of this patent is extended or adjusted under 35 U.S.C. 154(b) by 0 days.

(21) Appl. No.: 15/507,051

(22) PCT Filed: Oct. 7, 2016

(86) PCT No.: PCT/GB2016/053128
§ 371 (c)(1),
(2) Date: Feb. 27, 2017

(87) PCT Pub. No.: WO2017/060723
PCT Pub. Date: Apr. 13, 2017

(65) Prior Publication Data
US 2018/0201350 A1 Jul. 19, 2018

(30) Foreign Application Priority Data
Oct. 7, 2015 (GB) .................................. 1517678.7

(51) Int. Cl.
*B63H 11/107* (2006.01)
*B63B 35/79* (2006.01)
(Continued)

(52) U.S. Cl.
CPC .......... *B63H 11/107* (2013.01); *B60P 3/1033* (2013.01); *B63B 35/7943* (2013.01);
(Continued)

(58) Field of Classification Search
CPC .................................................... B63H 11/107
See application file for complete search history.

(56) References Cited

U.S. PATENT DOCUMENTS 5,542,810 A * 8/1996 Florus .................. B60P 3/1033
280/414.1
2002/0168905 A1* 11/2002 Yanagihara ............ B63H 25/44
440/40
(Continued)

FOREIGN PATENT DOCUMENTS

WO 2011100654 A2 8/2011

OTHER PUBLICATIONS

"The International Search Report and Written Opinion of the International Searching Authority", in connection to PCT/GB2016/053128, filed Oct. 7, 2016, dated May 19, 2017.

*Primary Examiner* — Stephen P Avila
(74) *Attorney, Agent, or Firm* — McKee, Voorhees & Sease, PLC

(57) ABSTRACT

The invention relates to a craft in the form of a body to be sat or laid upon by a user and provided with power for use in a body of water. There is also provided a method for the use of the craft in game play and the use of the same in a manner which allows the power source for the drive to be managed. A system for transport, charging and/or communication with the craft from onshore is also provided, along with a system to allow the use of the craft within a specified area on the body of water to be maintained and controlled.

32 Claims, 8 Drawing Sheets

(51) Int. Cl.
*B60P 3/10* (2006.01)
*B63C 13/00* (2006.01)
*G08G 3/00* (2006.01)
*B63B 49/00* (2006.01)
B63H 25/02 (2006.01)
B63J 99/00 (2009.01)

(52) U.S. Cl.
CPC .............. *B63B 49/00* (2013.01); *B63C 13/00* (2013.01); *G08G 3/00* (2013.01); *B63B 2035/7903* (2013.01); *B63H 2025/028* (2013.01); *B63J 2099/008* (2013.01)

(56) References Cited

U.S. PATENT DOCUMENTS

| | | | |
|---|---|---|---|
| 2004/0111195 A1* | 6/2004 | Vries | B63B 49/00 701/21 |
| 2011/0181018 A1* | 7/2011 | Bruneau | B60P 3/10 280/414.1 |
| 2013/0104787 A1* | 5/2013 | Roman | B63B 35/79 114/55.56 |
| 2015/0064994 A1* | 3/2015 | Woods | B63B 35/7943 440/6 |
| 2017/0069214 A1* | 3/2017 | Dupray | G08G 5/0021 |

* cited by examiner

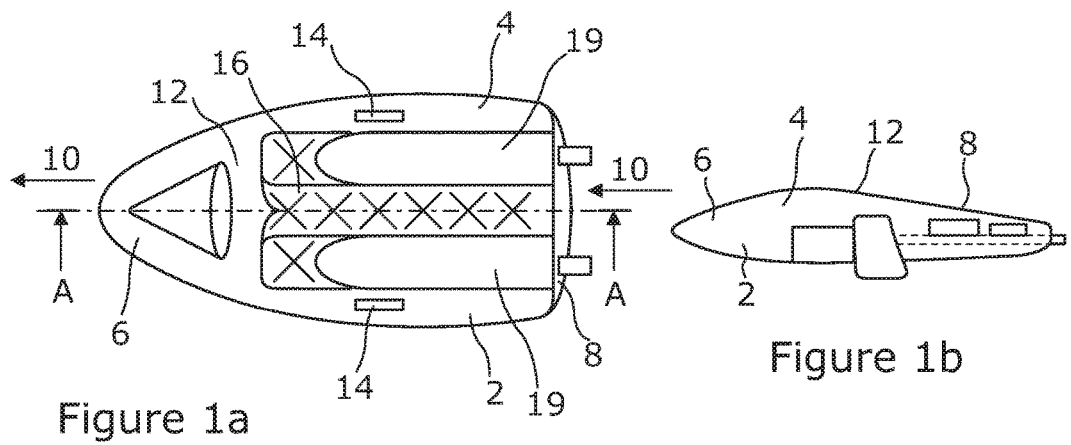
Figure 1a
Figure 1b
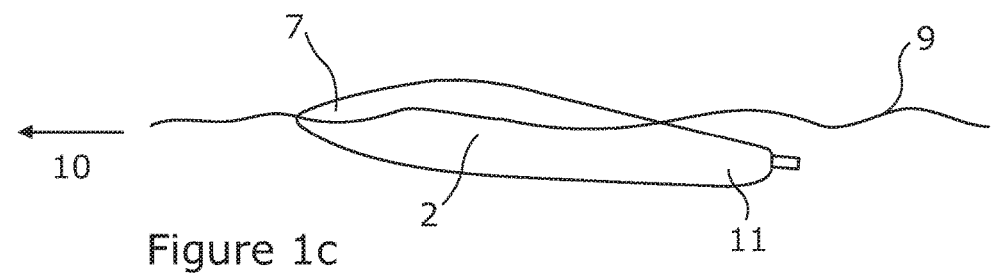
Figure 1c
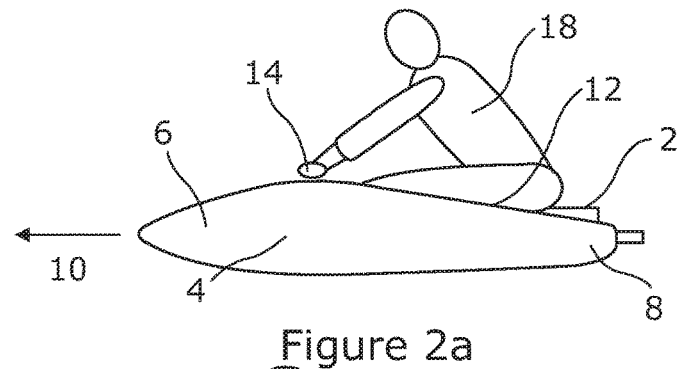
Figure 2a
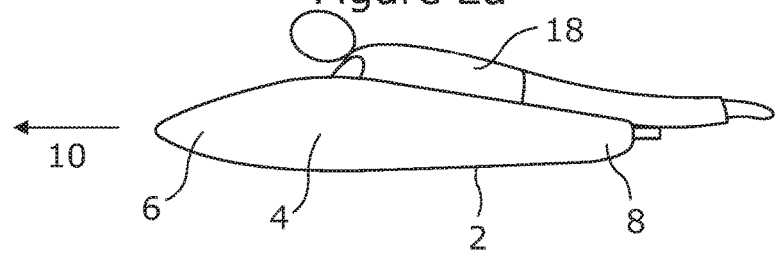
Figure 2b

CRAFT FOR USE ON A BODY OF WATER AND TRANSPORT AND CONTROL SYSTEM THEREFORE

The invention to which this application relates is a vehicle or craft, hereinafter referred to in a non-limiting manner as a craft, which is for use in a body of water such as the sea, ocean, lake or river. In particular, the craft is for use to propel a user of the same across and through the body of water, with power being provided from a power source mounted on the craft. The invention also includes transport and a control system therefore.

The provision of craft which float in a body of water and which are provided with a motor to power the same through and across the water is well known, in a large scale form of yachts, motor boats and the like, or on a smaller scale in the form of jet skis and the like. However, there are various safety concerns with the use of powered craft of this type, with respect to the safety of the persons in charge of the craft due to the relatively high power of operation of the same, and to the safety of other persons who may be in the body of water, due to the potential power and speed of the craft as they pass through the body of water.

It is also well known to provide craft which are propelled through and across the body of water as a result of wind hitting sails which are connected to the craft and/or due to the waves and/or currents in the body of water. However, these craft are often not desirable to use due to the complexity and skills required to control the same and/or due to the fact that the movement of the craft is dependent upon the environmental conditions at that time and, which conditions are variable and, if they are not suitable, i.e. if the water and/or wind is calm, there is no possibility to move the craft, which makes the use of the same undesirable.

The problems mentioned above are particularly relevant to older children and young adults who are of an age which means that they are not particularly attracted to "children's" craft but equally are not old enough or physically capable of using and controlling the larger or more powerful forms of craft.

A further issue which is experienced is with regard to the use of water craft on bodies of water, such as rivers, lakes or the sea and in which the use of craft is commonly restricted such that the craft cannot be used at all, or, more typically, the use is permitted but limited to a specific area. Conventionally the specific area is marked by placing a line of chain, rope and/or net with marker buoys at spaced locations there along so as to identify a boundary of the area in which the use is permitted.

The limitation of the area of use can be due to concerns over the safety of other users of the body of water, or, if the craft are to be operated by relatively young or inexperienced users, there may be concerns about the safety of the operators of the craft. Furthermore, if the craft are rented out to users then there are concerns about the possibility of the craft being stolen by the person operating the craft at any time.

A problem with the conventional buoy marking system is that while the same can provide a clear indication of the boundary line which is required to be adhered to, the same do not actually act to prevent the movement of at least certain types of craft beyond the same so that if, for example, a user of the craft decided to steal the craft they could do so by simply guiding the craft over the boundary line. Alternatively if an operator of the vehicle is not aware of the boundary or didn't understand the instructions the operator is not prevented from moving the craft beyond the permitted area which may expose the craft and/or operator to potentially more hazardous environments. This is of particular concern to the parents of children who are operating the craft and the parents ideally would like to have some greater certainty that the operation of the craft can be prevented or restricted when the same is in a non-permitted area.

A further issue is with regard to the transport of the water craft, with a trailer typically being used to move the craft across land between a storage location and a launch location. The conventional trailers are typically mechanical in nature in that they comprise a framework which defines one or more locations for carrying the craft, and a wheel assembly to allow the trailer to be moved across ground. In certain instances the trailer is provided with an electrical connection to allow the same to be connected to a vehicle, typically for the purpose of operating warning lights on the trailer when the trailer is being moved along a road and/or to provide power for a winch which may be located on the trailer and which can be used to move the craft back onto the trailer when being removed from the water.

The problem with these conventional trailers is that while they perform the basic required functions, they remain unused for significant periods of time. Furthermore, the location at which the craft are to be used, i.e. the launch location, can have limited facilities such as if the launch location is a beach, park or the like. In certain instances, where, for example, the rental of the craft is being performed as a business, there is a need at the launch location to be able to provide vending and monitoring facilities and/or facilities which allow the craft to be available for use. There can also be a desire to allow the trailer to be moved to a preferred launch location where vehicle access is not possible such as due to confined space and/or unfavourable surface conditions such as sand on a beach.

An aim of the present invention is to provide a craft which can be used in a body of water to propel a person across and/or through a body of water and a further aim is to provide the craft in a form which can be controllable without the need for particular physical strength and without creating significant hazard to others who may be in the body of water at that time. A further aim of the invention is to operate a fleet of the craft effectively.

A yet further aim of the present invention is to provide apparatus and a system for monitoring the usage of a vehicle, such as a water craft and to include the ability to prevent or restrict the operation of the craft when the craft is approaching, or has moved beyond, a predetermined boundary.

A further aim of the present invention is therefore to provide a trailer in a form which has improved utility and a further aim is to allow the trailer to be moveable to a desired location independently of a vehicle.

In a first aspect of the invention there is provided a craft for powered movement with respect to a body of water, said craft including handle means by which a user can grip the craft and be propelled across the body of water thereby, a power supply and at least one fluid inlet and at least one fluid outlet separated by at least one connecting channel and wherein a motor is provided to rotate one or more vanes on a longitudinal shaft positioned in the at least one channel intermediate to the said at least one inlet and at least one outlet in order to generate a propelling force for the said craft.

In one embodiment there is provided a first inlet connected to a first outlet at or adjacent to one side of the craft and connected by a channel and a second inlet connected to a second outlet at or adjacent to the opposing side of the craft and connected by a channel.

In one embodiment, one channel connects all of the inlets and outlets together or, alternatively, a channel is provided for each inlet/outlet pair and a shaft and vane assembly is provided for each channel.

In one embodiment the vanes are located along the longitudinal shaft such that when the shaft is rotated the same, in conjunction with the shape of the channel create the propulsion force by moving the water from the inlet to the outlet.

Typically the channel is shaped so as to provide a venturi effect on the fluid as it passes through the channel.

Typically, at least a portion of the fluid which enters through the inlet leaves the craft in the form of a jet of water.

In one embodiment the jet of water acts as a means to indicate the location of the craft to onlookers on other craft and/or at the side of the body of water. The jet of water can also, in one embodiment, be used as a means of indicating the propulsion power at which the craft is being operated at that time.

In one embodiment at least a portion of the water which enters the craft from the inlet is directed via passages around and/or past the motor of the craft so that the water acts as a coolant for the operation of the motor.

In one embodiment the portion of water which acts as the coolant is directed so as to leave the craft as the jet of water.

In one embodiment, there is provided an on/off switch which allows the control of power to the motor. Typically the switch can be provided to be failsafe in that the power to the motor is switched off to prevent dangerous scenarios.

In one embodiment the failsafe means can be provided in the form of a cord attached to the person which, if the person is to fall off the craft, causes the switch to be disengaged. In addition, or alternatively, switch means can be provided on the underside of the craft which will move to an off position to disengage the motor if the same is out of contact with the body of water. This would typically be operated should the craft capsize or when the craft is not placed in the body of water.

In one embodiment, one or more deflecting means are provided at the outlet to be pivotably movable between a first position and a second position, with movement of the deflecting means between said positions dependent upon the pressure of the flow of fluid through the outlet at that time. Typically, the greater the pressure of the flow of fluid then the more the deflecting means is urged towards the second position to allow the water to be expelled to a greater level and possibly above the level of the body of water.

In one embodiment the deflecting means is biased towards the first position in which the water is expelled therefrom down into the body of water thereby preventing the water from the outlet from causing injury by being expelled out of the water when the craft is not moving, or moving slowly, such as when the person is getting on to or getting off the craft.

Typically the craft is provided with a body formed by any suitable material such as by vacuum forming HDPE or GRP. Typically the body includes the handle means, power supply and shaft and at least part of the one or more channels, with the remainder of the channels being formed by panels which are located on the body and which are available to be removed to allow access to the components within the body for repair and maintenance.

In one embodiment the power supply is formed by one or more battery packs which are mounted within the body and which are rechargeable when the craft is docked to a charging apparatus.

Typically the battery packs are located so as to be readily replaceable in the housing body. This therefore means that spent battery packs can be replaced with battery packs during a normal day of operation and therefore allow the craft to be available to be used at all times which it is especially important if the craft is being rented out for periods of time during the day.

In one embodiment the craft includes location detection means, such as GPS, so as to allow the location of the craft on the body of water to be detected and, in one embodiment for the movement of the craft to be confined to a particular geographical area on the body of water.

In one embodiment the craft includes means to allow the wireless communication between the craft and the person using the same and/or with persons using other craft and/or with persons at the side of the body of water. The wireless communication can include any, or any combination of, Wi-Fi, WLAN and/or Bluetooth communication systems. In one embodiment the person is provided with a helmet with microphone and speaker which is capable of wireless communication with the craft. In turn the craft communication means allows the transmission and reception of sound with other craft and persons using those, and/or for example, if the person is a child, with their parents on the side of the body of water.

In one embodiment there is provided a control system which includes a base station and to which several craft are connected via a wireless local area network (WLAN) to allow communication between the craft and/or base station.

In one embodiment the system includes predetermined zones and in one embodiment there is provided an operating zone and a security zone.

In one embodiment the base station consists of a computer and display system connected to one or more high gain directional Wi-Fi antenna to provide best coverage of the normal operation zone. This computer will be used to monitor and control the individual boards as instructed by a supervisor operator.

The main supervisor roles can include any or any combination of the setup of initial maximum speed and distance values for individual craft according to the riders skill level, height and weight; the monitoring of the craft operation and raise alerts whenever an unauthorised condition is met.

Unauthorised conditions can include the boards leaving the operating zone, exceeding predetermined maximum speeds, excessive impact vibrations and/or attempted operation of the propulsion unit while inverted.

In one embodiment the craft contain a computer control system to perform all aspects of the required functionality. These tasks include any or any combination of; the control of the propulsion unit, the operation of on board displays, data capture, location monitoring for user safety and location monitoring for craft security.

Typically the main jet thrust unit will be powered from an on-board rechargeable battery. The amount of thrust will be variable from zero to a pre-set upper limit which will be set by the supervisor at the time the craft is hired. The pre-set limit will be programmed into the craft via the supervisor control link from the base station. The computer will then monitor the user demand inputs and adjust the power supplied to the motor via the on board PWM controller. The system will also monitor the battery level and reduce output power when battery charge is low.

Typically each craft will monitor various parameters within the electronic system including battery voltage, motor speed and craft speed. This information will be recorded into local non-volatile memory. The information will also be transmitted back to the base station over the WLAN.

In one embodiment each craft will contain a GPS receiver to attain real time position and velocity data. This data will be used for several aspects of the craft control. The speed data will be used to limit the maximum speed the craft can achieve as set by the supervisor control data.

In normal usage, the location information will be used to determine if the craft goes outside the operating zone. In this event an alarm indicator will flash and the prolusion unit will be stopped. While outside the operating zone the propulsion will only restart if the craft is progressing back towards the geo fenced zone.

In one embodiment, if the craft is taken out of the security zone the system will consider the craft to be stolen. In this event the craft will enter lockout state. In lockout state the control system will disarm the propulsion and display functions. The craft will also scan for public Wi-Fi access points and send location information messages to a known security web server. Once in lockout state the craft will only reset to operation mode via a secure command from the supervisor. The lockout state will be maintained across any power interruptions.

In one embodiment of the invention there is provided apparatus for monitoring the usage of the craft with respect to a predetermined boundary of use, said apparatus including signal emitting means to emit a signal from the craft, a base station with receiving means to receive said emitted signals, a memory in which the location of the predetermined boundary is stored, and processing means to determine the location of the craft on the basis of the received signals with respect to the boundary and if the determined location is at, adjacent to or beyond the said boundary an alert condition is activated.

In one embodiment, the determination of the location being such as to cause the alert condition to be activated is if an emitted signal is not received within a predefined time period due for example to the craft from which the emitted signals being located beyond the range over which the emitted signals can pass to the base station.

In another embodiment the alert condition is activated if the strength of emitted signals received at the base station reduces below a predetermined level.

In another embodiment the alert condition is activated if an emitted signal received from the craft is such as to indicate an alert, and has therefore been positively emitted by the operator of the craft, or by the control system of the craft such that, for example, if there has been a malfunction of the operation of the craft or if a safety device on the craft indicates that the operator is no longer present on the craft.

In one embodiment the alert condition includes a visible and/or audible alert being generated at the base station. In addition, or alternatively, the alert condition includes sending an alert signal to a remote monitoring location and/or the owner of the craft and/or one or more persons associated with the operator of the craft at that time.

Preferably, and possibly in combination with any of the previously mentioned alert options, the alert condition includes the transmission of a signal to the craft control system to change the condition of operation of the same. This change in operating condition may be to cut power completely to prevent powered movement, or to allow limited power to be provided for a period of time to allow the limited powered movement of the craft to enable the same to be guided back within the boundary before the power is then cut, or to only allow the craft to be moved in a single direction, such as reverse, in one embodiment, or to allow the craft to be automatically steered and moved towards the base station.

In one embodiment the alert condition includes causing an audible and/or visual alert to be generated by the craft so as to allow onlookers in other craft or on the shore to be aware of the particular craft to which the alert relates.

Typically the signal is emitted from the base station and is emitted with a sufficient strength and range so as to be received by the craft even when the craft is outside the boundary.

In one embodiment the craft will independently trigger the alert condition in the absence of any signal from the base station after a predetermined time.

In one embodiment it is preferred that the alert condition is activated when the craft is adjacent to a physically marked boundary so that the alert condition is activated a sufficient period of time in advance and before the craft actually crosses the boundary.

In one embodiment there is provided a trailer for the location of one or more of the craft thereon, said trailer including a frame which defines locations at which the craft can be placed and supported, a wheel assembly which allow the trailer to be moved between locations whilst carrying the said craft and wherein the trailer includes at least one power source mounted thereon and for use to power at least one function provided from the trailer.

In one embodiment the trailer includes a first power source which is provided to allow functions related to the trailer to be performed.

In one embodiment the same or a further power source is provided to allow power to be provided to the craft located on the trailer.

In one embodiment the trailer includes a first power source for the trailer functions and multiple further power sources for use with the craft which are carried thereby.

In one embodiment the frame defines location positions for the further power sources thereon and, in one embodiment, the said locations include electrical connections for the power sources to allow the same to be charged when they are located on the frame.

In one embodiment, when the craft are located on the frame, the same can be connected to a power and/or data connection. This allows power to be provided to the craft to charge battery packs mounted in the same and/or to provide power to allow other features of the craft to be operated and/or accessed while the craft is mounted on the trailer.

In one embodiment the charge can be obtained from the trailer power source or alternatively from a mains power supply which may be connected to the trailer.

In one embodiment, each of the further power sources comprises a bank of batteries.

In one embodiment, the craft may be rented for intervals of time during a period of time, such as a day, and the craft are required to be charged and available for use during that period of time. This is required to ensure that the craft are available to be used when rented. This is achieved in accordance with the invention by providing the charged batteries on the trailer so that they can be selectively removed from the trailer and placed into the craft so as to provide power thereto and any discharged batteries are removed from the craft and placed onto the trailer.

In one embodiment the trailer has the capacity to carry as many charged batteries as are required in order to allow all of the craft to be operable for the said period of time. In addition or alternatively, the trailer can be provided with the capacity to recharge the batteries by using a power supply provided on the trailer. In one embodiment the said power supply may be another battery or batteries which are provided to allow other functions to be performed.

This therefore ensures that the operator renting the craft has all of the same available for use and therefore maximises the potential earnings from the craft in the said period of time.

In one embodiment, when the craft are mounted on the trailer, data can be collected from the craft via the data connection and stored in a memory provided on the trailer and/or in a memory of a device connected to, or in communication with, the trailer.

In one embodiment, the trailer includes a data connection so as to allow a data processor such as a laptop computer, to be connected thereto and allow the transfer of data from the craft mounted on the trailer and the laptop. In addition, or alternatively, the trailer is provided with a wireless communication facility in order to allow data communication between the trailer and another location which may be remote from the trailer. Typically the other location can be provided with a server to process and interpret the collected data such as to indicate usage, and/or may provide the facility for payments such as cash and/or card payments, to be taken for the use of the craft.

In one embodiment, one of the functions of the trailer which is powered by the trailer power source is the provision of a motor which is operable and provided in connection with the wheel assembly to allow the powered movement of the trailer across a surface without the need for the trailer to be connected to a vehicle.

In one embodiment, one of the functions of the trailer which is powered by the trailer power source is to act as a base station for the monitoring of the usage of the craft, with the trailer acting as a location for the transmission and/or reception of data to and from the craft whilst the craft are separated from the trailer. The monitoring can also be provided in order to prevent theft of the items and/or to ensure that the items are only used in a predefined environment or range of the trailer.

In a further aspect of the invention there is provided a trailer and water craft assembly, said trailer provided with a frame on which at least one craft is located and location means for a plurality of power sources, wherein said trailer includes at least one data and/or power connector with which the craft can be connected to allow the transfer of power and/or data between the trailer and the at least one craft.

In one embodiment the assembly includes means to allow the transfer of data between the trailer and a data processing means via wired or wireless connection so as to allow the usage of the craft to be analysed and/or the operation of the craft to be adapted or otherwise controlled.

In one embodiment the data which is transferred is telemetric data.

In a further aspect of the invention there is provided a control system which includes a base station and several craft which are connected via a wireless local area network (WLAN) to allow communication between the craft and/or base station.

In one embodiment the system includes predetermined zones and in one embodiment there is provided an operating zone and a security zone.

In a further aspect of the invention there is provided apparatus for monitoring the usage of the craft with respect to a predetermined boundary of use, said apparatus including signal emitting means to emit a signal from the craft, a base station with receiving means to receive said emitted signals, a memory in which the location of the predetermined boundary is stored, and processing means to determine the location of the craft on the basis of the received signals with respect to the boundary and if the determined location is at, adjacent to or beyond the said boundary an alert condition is activated.

In one embodiment, the determination of the location being such as to cause the alert condition to be activated is if an emitted signal is not received within a predefined time period due for example to the craft from which the emitted signals being located beyond the range over which the emitted signals can pass to the base station and/or if the strength of emitted signals received at the base station reduces below a predetermined level and/or if an emitted signal received from the craft is such as to indicate an alert, and has therefore been positively emitted by the operator of the craft, or by the control system of the craft such that, for example, if there has been a malfunction of the operation of the craft or if a safety device on the craft indicates that the operator is no longer present on the craft.

In one embodiment the alert condition includes a visible and/or audible alert generated at the base station and/or the sending of an alert signal to a remote monitoring location and/or the owner of the craft and/or one or more persons associated with the operator of the craft at that time.

Preferably, and possibly in combination with any of the previously mentioned alert options, the alert condition includes the transmission of a signal to the craft control system to change the condition of operation of the same. This change in operating condition may be to cut power completely to prevent powered movement, or to allow limited power to be provided for a period of time to allow the limited powered movement of the craft to enable the same to be guided back within the boundary before the power is then cut, or to only allow the craft to be moved in a single direction, such as reverse, in one embodiment, or to allow the craft to be automatically steered and moved towards the base station.

In one embodiment the alert condition includes causing an audible and/or visual alert to be generated by the craft so as to allow onlookers in other craft or on the shore to be aware of the particular craft to which the alert relates.

Typically the signal is emitted from the base station and is emitted with a sufficient strength and range so as to be received by the craft even when the craft is outside the boundary.

In one embodiment the craft will independently trigger the alert condition in the absence of any signal from the base station after a predetermined time.

In one embodiment it is preferred that the alert condition is activated when the craft is adjacent to a physically marked boundary so that the alert condition is activated a sufficient period of time in advance and before the craft actually crosses the boundary.

In a further aspect of the invention there is provided a trailer for the location of one or more items thereon, said trailer including a frame which defines locations at which the items can be placed and supported, a wheel assembly which allow the trailer to be moved between locations whilst carrying the said items and wherein the trailer includes at least one power source mounted thereon and for use to power at least one function provided from the trailer.

In one embodiment the trailer includes a first power source which is provided to allow functions related to the trailer to be performed.

In one embodiment the same or a further power source is provided to allow power to be provided to the items located on the trailer.

In one embodiment the trailer includes a first power source for the trailer functions and multiple further power sources for use with the items which are carried thereby.

In one embodiment the frame defines location positions for the further power sources thereon and, in one embodiment, the said locations include electrical connections for the power sources to allow the same to be charged when they are located on the frame.

In one embodiment, when the items are located on the frame, the same can be connected to a power and/or data connection. This allows power to be provided to the items to charge battery packs mounted in the same and/or to provide power to allow other features of the item to be operated and/or accessed while the item is mounted on the trailer.

In one embodiment the charge can be obtained from the trailer power source or alternatively from a mains power supply which may be connected to the trailer.

In one embodiment, each of the further power sources comprises a bank of batteries.

In one embodiment the items are water craft and the craft are provided to be used from the trailer. In one embodiment, the craft may be rented for intervals of time during a period of time, such as a day, and the craft are required to be charged and available for use during that period of time. This is required to ensure that the craft are available to be used when rented. This is achieved in accordance with the invention by providing the charged batteries on the trailer so that they can be selectively removed from the trailer and placed into the craft so as to provide power thereto and any discharged batteries are removed from the craft and placed onto the trailer.

In one embodiment the trailer has the capacity to carry as many charged batteries as are required in order to allow all of the craft to be operable for the said period of time. In addition or alternatively, the trailer can be provided with the capacity to recharge the batteries by using a power supply provided on the trailer. In one embodiment the said power supply may be another battery or batteries which are provided to allow other functions to be performed.

This therefore ensures that the operator renting the craft has all of the same available for use and therefore maximises the potential earnings from the craft in the said period of time.

In one embodiment, when the craft are mounted on the trailer, data can be collected from the craft via the data connection and stored in a memory provided on the trailer and/or in a memory of a device connected to, or in communication with, the trailer.

In one embodiment, the trailer includes a data connection so as to allow a data processor such as a laptop computer, to be connected thereto and allow the transfer of data from the craft mounted on the trailer and the laptop. In addition, or alternatively, the trailer is provided with a wireless communication facility in order to allow data communication between the trailer and another location which may be remote from the trailer. Typically the other location can be provided with a server to process and interpret the collected data such as to indicate usage, and/or may provide the facility for payments such as cash and/or card payments, to be taken for the use of the craft.

In one embodiment, one of the functions of the trailer which is powered by the trailer power source is the provision of a motor which is operable and provided in connection with the wheel assembly to allow the powered movement of the trailer across a surface without the need for the trailer to be connected to a vehicle.

In one embodiment, one of the functions of the trailer which is powered by the trailer power source is to act as a base station for the monitoring of the usage of the craft, with the trailer acting as a location for the transmission and/or reception of data to and from the craft whilst the craft are separated from the trailer. The monitoring can also be provided in order to prevent theft of the items and/or to ensure that the items are only used in a predefined environment or range of the trailer.

Specific embodiments of the invention are now described with reference to the accompanying drawings; wherein FIGS. 1a-c illustrate plan and side views of a craft in accordance with one embodiment of the invention;

FIGS. 2a-b illustrate two different embodiments of use of the craft by a person;

FIGS. 3a-d illustrate sectional views along line AA of the craft;

FIGS. 4a and b illustrates the positions of a deflecting means provided as part of the craft in one embodiment;

Figure 3A:
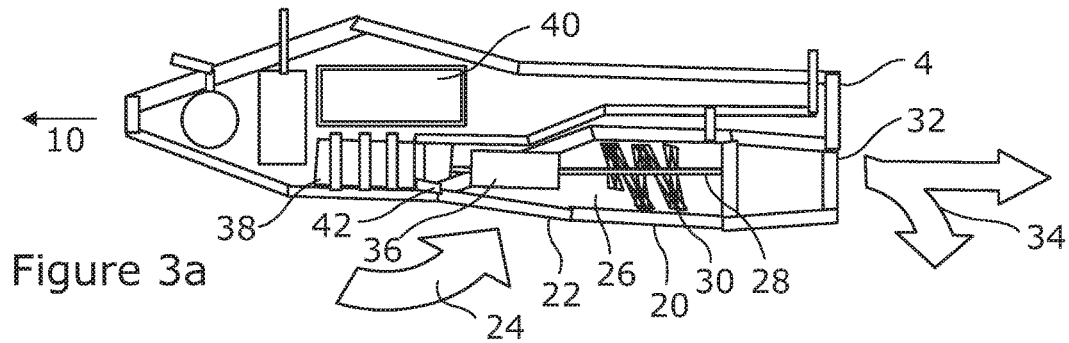

Referring firstly to FIGS. 1a and b there is illustrated an embodiment of the craft 2 in accordance with one embodiment of the invention. The craft 2 includes a body 4 which is buoyant and which has a front portion 6 shaped to pass through water with relative ease and a rear portion 8 from which water under pressure and acting as a propulsion force leaves the body in order to propel the craft in the direction 10. On the top face 12 of the body there are provided handle means 14 to be gripped by the person when on the craft. There is also provided a seating portion 16 formed and shaped to locate the person thereon with leg recesses 19 for the location of the user's legs. Typically, although not necessarily exclusively, the craft is provided to be used by a single person thereon FIGS. 2a and b illustrate two embodiments of use of the craft 2. In FIG. 2a there is illustrated the body 4 with the person 18 using the craft located on the top surface 12 in a kneeling position. In FIG. 2b the person 18 is shown located on the top surface 12 of the craft in a laid down position. In both cases the person can cause the craft to be steered by altering their position with respect to the craft or in another embodiment the handle gripping positions could be provided in the form of a steering bar which can be moved in a similar manner to that of a jet-ski to cause a change in direction.

The craft may, in one embodiment be provided to operate at a constant speed with simple stop and start controls or alternatively there can be provided a throttle to be used by the person to allow the power of the propulsion force created by the motor to be controlled.

In one embodiment a constant speed is selected prior to commencement of use in the body of water. The speed may be selected from a range of different speeds which are available to be selected and the motor is limited with respect to the speed which is selected at any given time.

The speed may be selected with reference to a user preference and/or preference of a responsible adult if the person using the craft is a child.

In one embodiment the speed which is selected is made with regard to the weight and/or height and/or another parameter of the person who is to use the craft at that time, so that the operation of the craft can be best suited to be safely used by the person at that time.

The craft is intended to be used in the form of a body board rather than a surf board and, as such, the length of the body will typically be no greater than 1.5 meters and most typically in the range of 900 to 1500 mm in length. This allows greater flexibility of use and increased manoeuvrability so making the same more agile than a surf or longer board. It also allows the board and hence the craft to be sufficiently buoyant and be able to take into account the differences in weights of a potentially wide range of users of the craft, although typically there will be certain age and/or size restrictions with respect to potential users of the craft. The craft will typically be designed to be semi submersible such that when in use with the front 7 of the craft 2 is above the surface 9 of the water and gradually enters and moves below the surface 9 of the water towards the rear 11 of the body as illustrated in FIG. 1c.

Referring now to FIGS. 3a-d there are illustrated in a schematic fashion the internal components of the body 4 of the craft 2. The body includes therein at least one inlet 22 on the underside 20 and through which water drawn from the body of water in which the craft is located enters the craft in the direction of arrow 24 into a channel 26. In the channel 26 there is located a longitudinal shaft 28 on which are mounted helically formed vanes 30. The vanes and channel are formed such that when the vanes are rotated by the longitudinal shaft 28, a venturi effect is created on the water flowing through the channel towards the outlet 32 from which the water leaves as indicated by arrows 34 to propel the craft in the direction 10.

The shaft 28 is located with a motor 38 mounted in the body and connected to the shaft via a bearing assembly 36 so that the motor rotates the shaft 28 to create the propulsion force for the craft.

The motor is powered by connection to one or more battery packs 40 which are located within the body and which can be recharged as and when required.

Figure 3B:
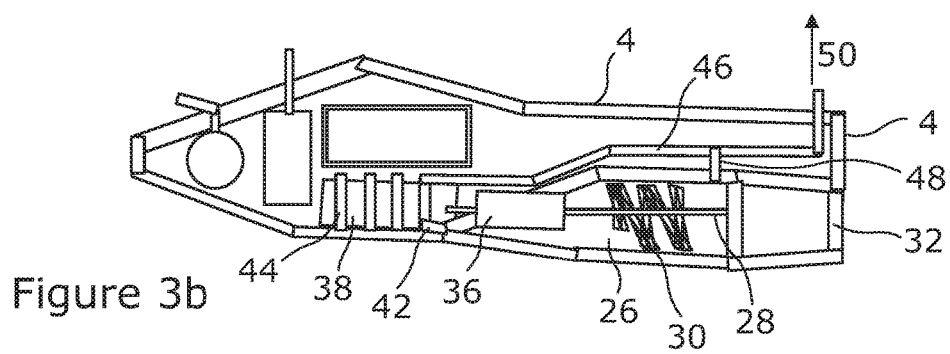

A portion of the water which enters the inlet 22 is diverted from the channel as illustrated by passage 42 in FIG. 3b and then is fed along passage 44 around the motor 38 to act as a coolant for the motor. The water can be pumped at this stage and/or at other locations via a pump provided on the craft. The water is then directed by passage 46 and may pick up further water under pressure from the channel via passage 48. The water then leaves the body as a jet of water as indicated by arrow 50. This jet of water can be useful in acting as a visual indicator of the location of the craft in the body of water and/or as a visual indication of the power at which the craft is being operated at that time.

Figure 3C:
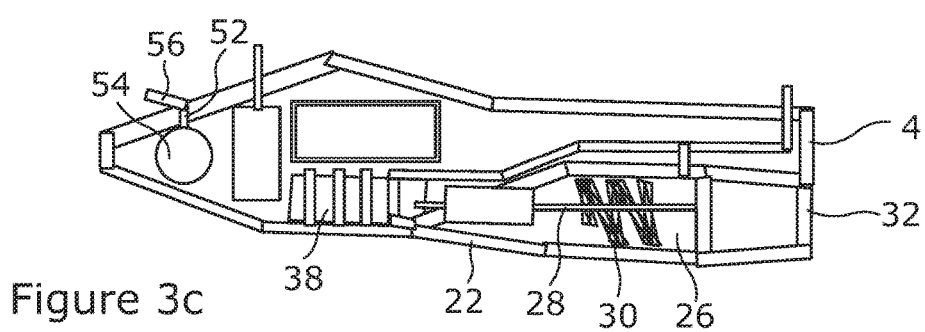
Figure 3D:
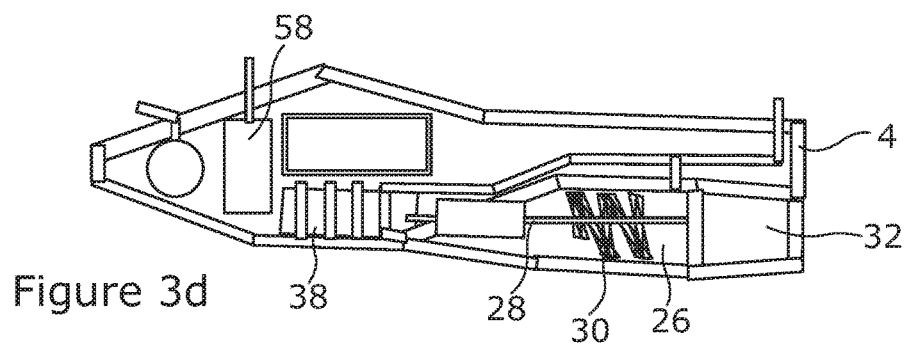

In a further embodiment of the invention as illustrated in FIG. 3c a further portion of the water which passes through the inlet may be passed to a user operable water jet device, with the water coming directly from the channel or from the coolant water passages shown in FIG. 3b. In either case, the water jet device 52 can be provided with a store of water under pressure 54 and a nozzle 56 via which a water jet can be selectively dispensed, typically by the person using control means on the device. Preferably the user can also move the device, typically by a pivoting action so as to direct the water jet which is emitted so as, for example, to direct the water jet at another craft or person. It is also preferred, as illustrated in FIG. 3, that the craft is provided with means such as a GPS system 58 to emit a signal which is indicative of the location of the device and which signal can be used, for example, in the control of operation of the craft and/or to prevent the craft from leaving a particular geographical area and/or as a means to detect the distance of movement of the craft and the expected time of the next charge of the battery packs to be required.

Figure 4A:
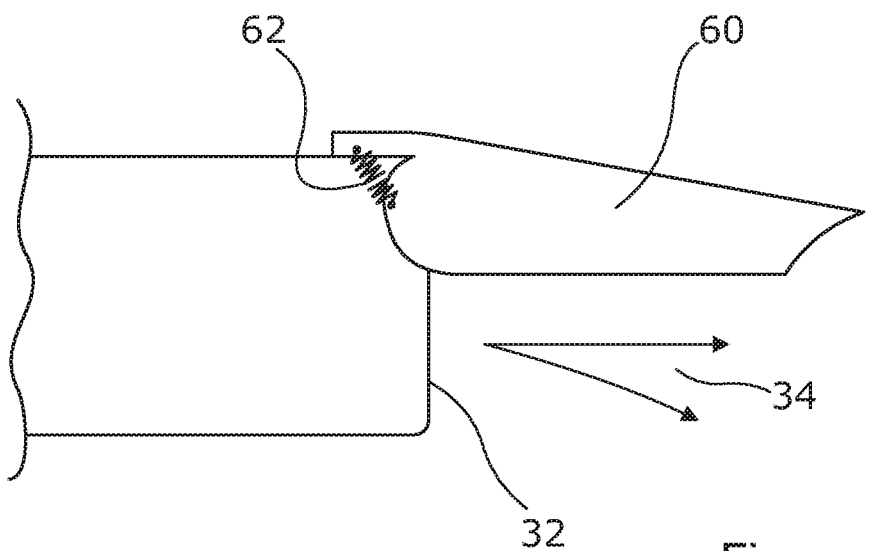

Turning now to FIGS. 4a and b there is illustrated the provision of deflecting means 60 which are located at the outlet 32 from the body, and attached to the body 4. The deflecting means can be moved between a first position as shown in FIG. 4a and a second position as shown in FIG. 4b.

In FIG. 4a the deflecting means are lowered in a position to which the same are biased by spring 62 and this causes the water which leaves the outlet 34 to be directed along and downwardly in the body of water as indicated by arrows 34. The effects of this are twofold (i) it creates an upwards lift of the craft prior to the same commencing forward motion enabling the craft to commence planning faster; and (ii) it prevents the pressurised water from passing upwardly and causing potential discomfort to the person using the craft when the pressure of the water leaving the outlet 32 is relatively low, such as when the craft is starting to move or coming to a standstill.

Figure 4B:
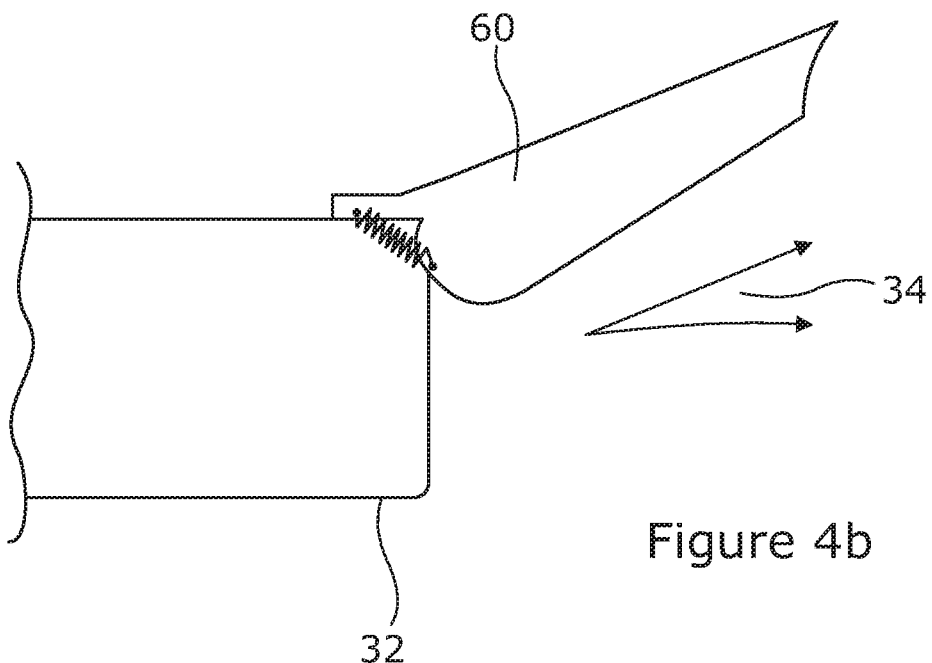

When the flow of fluid and hence pressure of the same increases, which will incur when the craft is in full motion, the pressure of the fluid is sufficient to cause the deflecting means to be moved to the upward position shown in FIG. 4b and hence fully open the outlet 32 to allow the water to pass in an upward direction as shown by arrows 34 as there is now a reduced risk of injury to the person.

Figure 11:
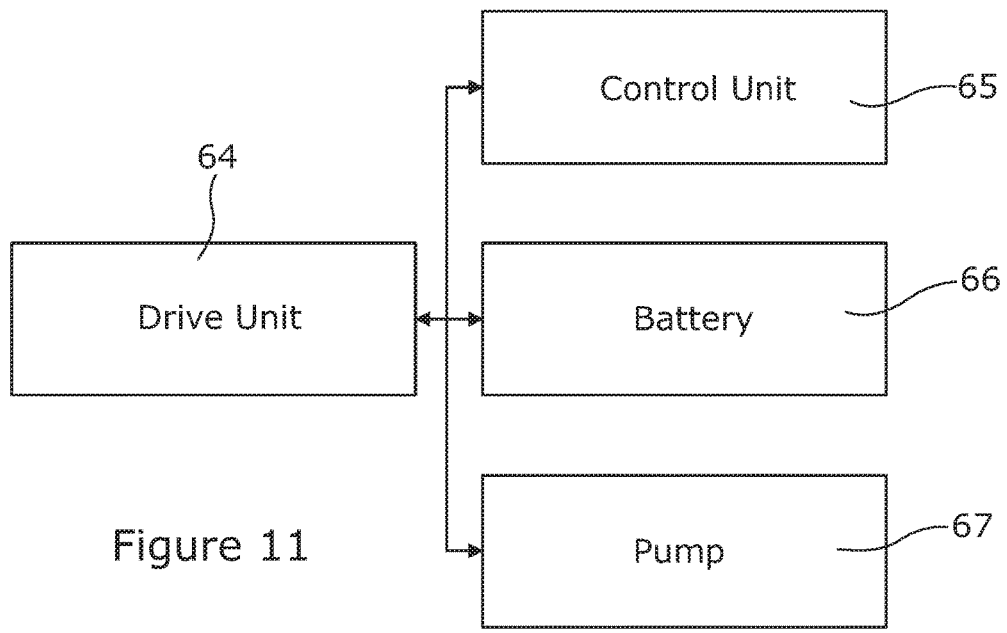
FIG. 11 illustrates schematically the components of an operating system for a craft in accordance with one embodiment of the invention.
Figure 12:
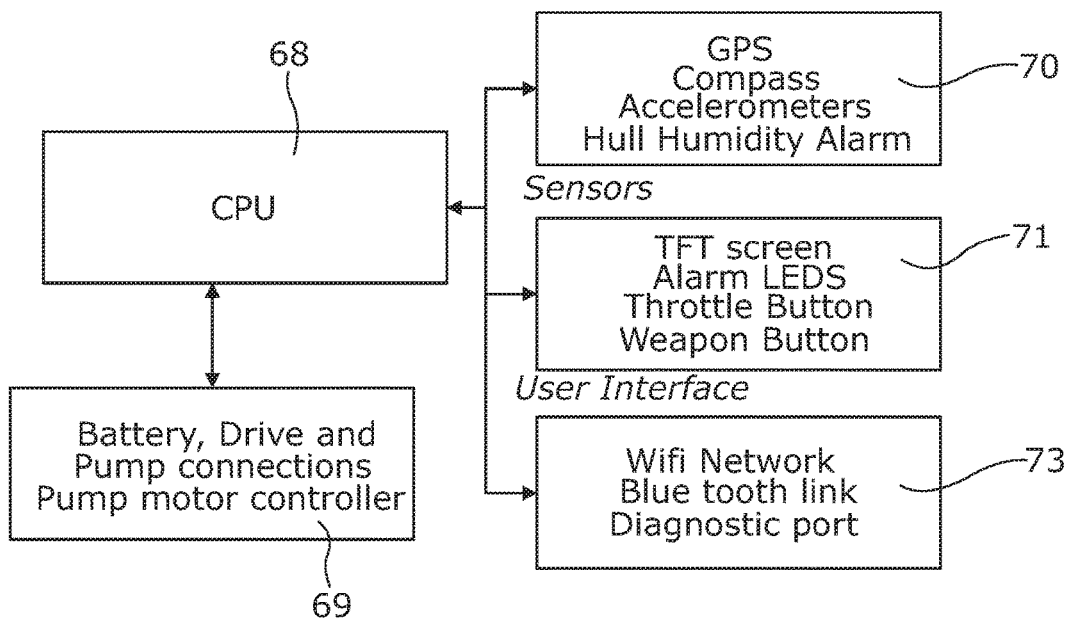
FIG. 12 illustrates schematically the components of the control unit of the craft in accordance with one embodiment of the invention.

Referring now to FIGS. 11-14 there is illustrated schematically the components which are provided as part of the craft in accordance with one embodiment of the invention. In FIG. 11 the key components are illustrated for the operation of the craft and these are the drive unit 64 which is provided as previously described to propel the craft. The operation of the drive unit 64 is dependent upon the operation and control of the Control Unit 65, the power source in the form of one or more batteries and the operation of the pump 67. FIG. 12 illustrates in greater detail the Control Unit 65 components which is this embodiment include a Central Processing Unit (CPU) 68 which is connected to control the pump, drive unit and battery operation 69. In order to allow the CPU to operate effectively connections are provided to receive data in the form of GPS, compasses, accelerometers and humidity alarms 70 to allow detection of conditions which will have an impact of the operation of the craft. A user interface 71 is also provided which includes a TFT display screen, alarm indicators, typically in the form of LED's, a throttle button and a weapon button. System connectivity is achieved by the provision of Wi Fi network, Bluetooth and diagnostic connection ports 73.

Figure 13:
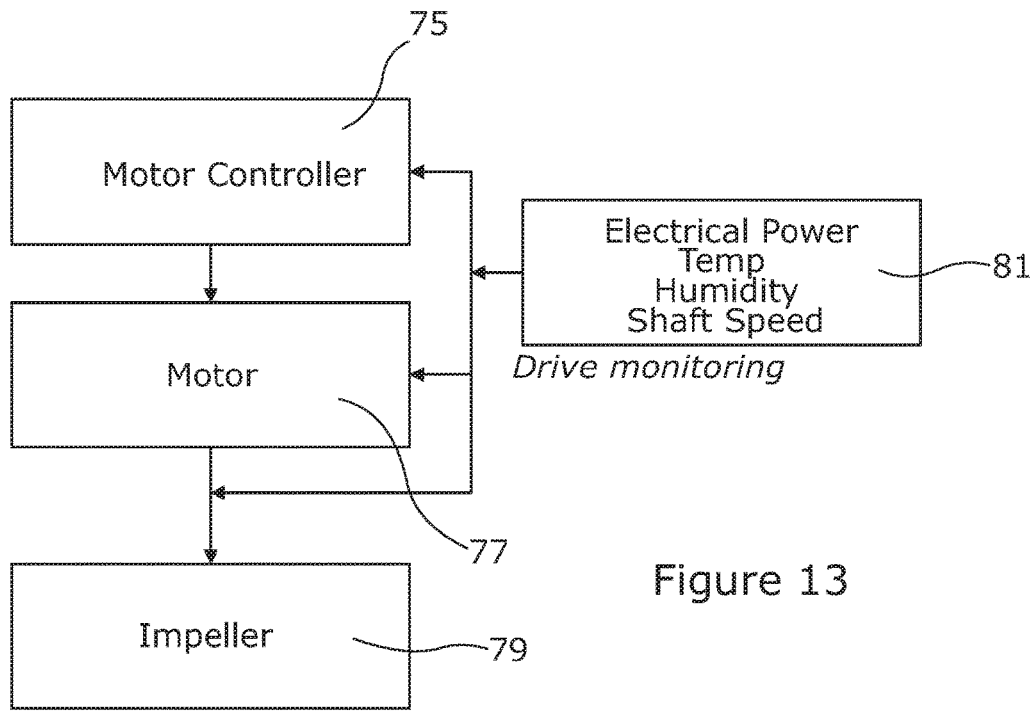
FIG. 13 illustrates schematically the components of a drive unit for a craft in accordance with one embodiment of the invention.

In FIG. 13 there is illustrated in greater detail the components of the drive unit 64. The drive unit includes a motor controller 75, the motor 77 which is connected to the impeller 79. In addition to these components, a monitoring system 81 is provided which allows operating parameters of the drive unit such as temperature, level of electrical power, humidity and speed of rotation of the shaft 28 to be monitored.

Figure 14:
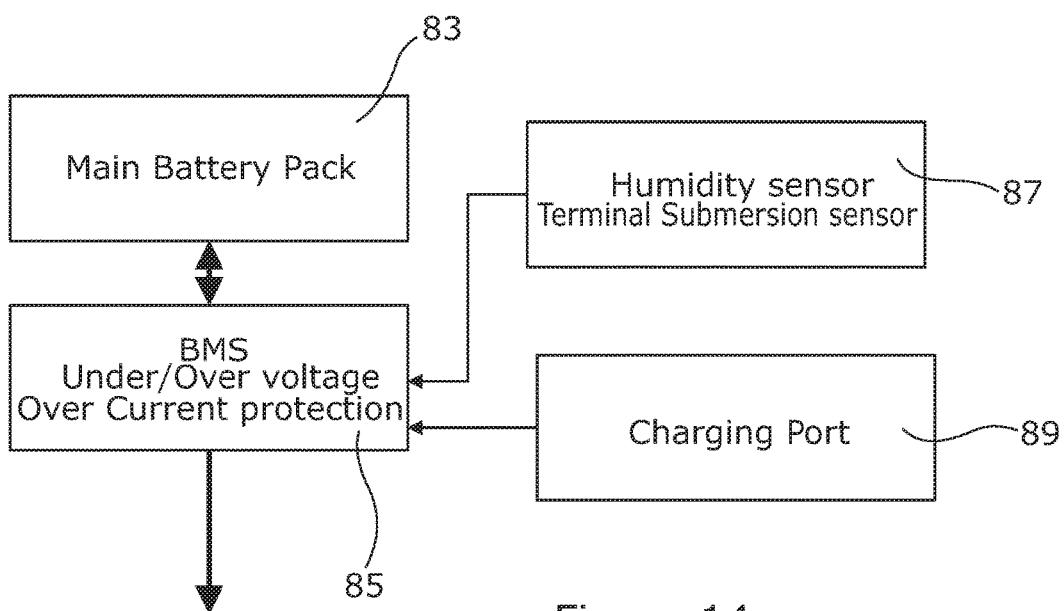
FIG. 14 illustrate schematically the battery system components for a craft in accordance with one embodiment of the invention.

FIG. 14 illustrates in more detail the components of the battery system 66 which include a main battery pack 83 which is provided with a protection system 85 in the form of a battery management system with under/over voltage protection and over current protection. The protection system also has inputs from a humidity sensor and terminal submersion system 87 and has a charging port 89.

An issue with all battery powered vehicles or craft is how to manage the available power in a manner which allows for effective use of the craft in a given time period. There is also a need to manage the use with reference to the most likely use of the craft. In accordance with the invention it is recognised that a large proportion of usage is likely to be by children and young adults and as part of the invention there is provided the ability to allow power usage management and also provide an additional attractive feature to the user of the craft, by providing a booster option to the drive of the craft during which the craft can be driven at a higher speed. Typically the booster option will comprise one or a number of boosters which can be selected to be used by the user within a particular period of usage of the craft, such as a session of use that the user has paid for. This provides a degree of selectivity to the user as to when the booster options can be used whilst at the same time ensuring that the craft is not operated at full power at all times and so the power can be managed so as to last for the duration of the session. The operation of the booster sessions may be achieved by altering the control of the motor unit to allow the speed limiter value to be increased for the duration of the boost. It may also be possible to increase the number or duration of the booster options by the user selecting to operate the craft at other times at a reduced speed and thereby effectively "free up" power which can be used to prolong or provide an additional booster option.

For example, if the battery unit for the craft has 500 watt hours available, then the user may operate the craft in normal operation at 50% of the capacity and the booster options allow the selective use of the remaining 250 watt hours to provide a higher speed of operation for a duration of time during the session. In one possible control scenario, the "normal" speed is preset and the booster option speed is present and the user can select to move between the two via the user interface on the craft and thereby use the booster options up to a predefined limit value which therefore ensures that sufficient power will still be left towards or at the end of the session to ensure that the jet can be powered back to the base. The available power and number of booster options which are available at any given time, are typically displayed on the display screen provided on the craft.

In addition, or alternatively the jet of water which is emitted from the craft and which is described in some detail with respect to FIGS. 3*a-d* can also be operated with differing levels of power of the jet of water which is emitted. For example, the operator of the craft, if they are playing a game with other users of other craft may decide to select a booster option to increase the power of the jet of water in order to have a greater impact when aiming the same at another craft and/or to increase the range of the water jet which is emitted and/or when they select to use the water jet from a predetermined number of times in which the jet of water can be used in a session. Once again this adds to the accuracy of the power management usage whilst adding to the enjoyment of the user of the craft.

There is therefore provided a craft which can be operated independently by a young person so as to provide the required sense of adventure and control whilst, at the same time, the craft can be controlled without significant physical exertion or complexity and be provided to operate in a safe manner. It should be noted that the craft in accordance with this invention may be used in conjunction with geographical movement restriction systems and methods and/or with land movement and charging apparatus as will now be described.

Figure 5:
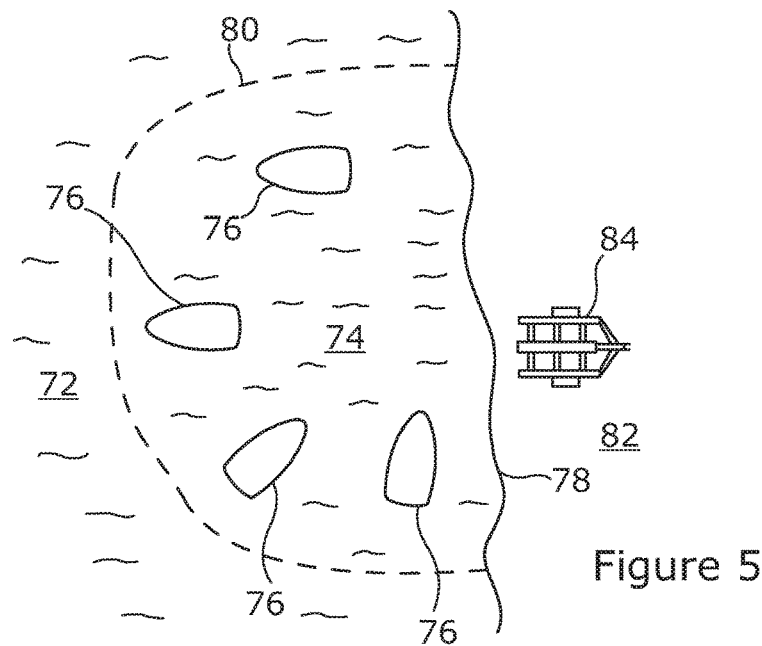
FIG. 5 illustrates in plan a permitted area in which a number of craft can be operated.
Figure 6:
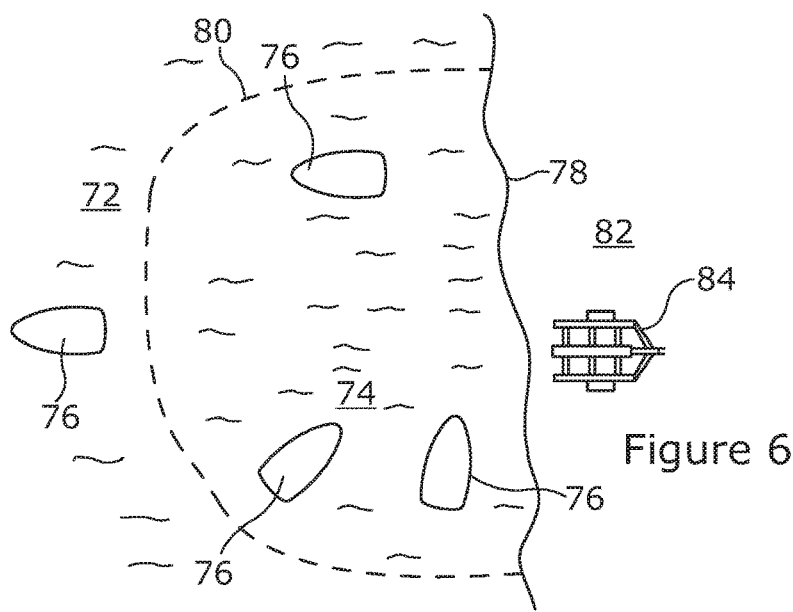
FIG. 6 illustrates in plan a circumstance where one of the craft has gone beyond a permitted boundary of FIG. 5.

Referring now to FIGS. 5 and 6 there is illustrated in plan, a part of a body of water 72 which includes an area 74 in which the use of craft 76, such as the craft previously described, is permitted. The area 74 is outlined by shore or bank 78 and the remainder is defined by a predefined boundary 80. The boundary may not be physically marked or could be marked by a line of buoys so as to provide a visual indication to users of the craft 76. The bank 78 can be that of a lake or river or could be a beach and, in any case there is provided land 82 on which a base station 84 is provided and which, in this case, is provided as an integral part of a trailer used to store and move the craft.

Figure 7:
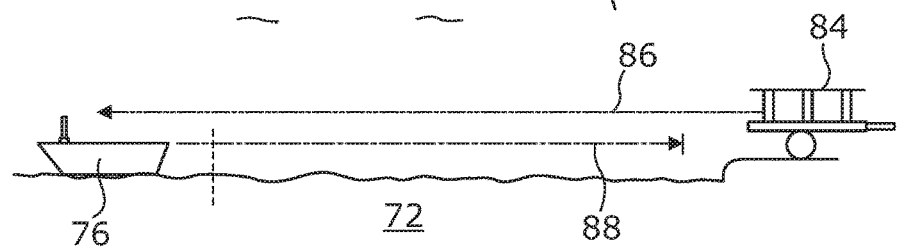
FIG. 7 illustrates in a schematic manner the communication between the craft of FIG. 5 and the base station in accordance with one embodiment of the invention.

In accordance with the invention the base station is provided to transmit and receive data signals, typically via wireless communication means. Typically, as shown in FIG. 7, the strength or range of the transmitted signal 86 from the base station is greater than the strength of the signal 88 transmitted from the craft 76.

The range or strength of the signal transmitted from the craft is set so as to effectively define the predetermined boundary 80 of the area 74 as, if the signals transmitted from the craft are received by the base station continuously or at regular time intervals this indicates that the craft is still in range and therefore within the predefined area, as illustrated in FIG. 5. However if a craft, such as craft 76' in FIG. 6, goes beyond the boundary 80 then the signal 88 transmitted from the craft 76' cannot be received by the base station as indicated in FIG. 7. When this occurs, the signal 86 transmitted from the base station 84 is of sufficient strength so as to reach the craft 76' and cause a change in condition of the craft operation such as, for example, to disable the powered movement of the craft, disable the steering and/or change the direction of movement back towards the base station automatically and thereby prevent the craft from moving further away from the allowed area 74 and return the craft to that area. In addition, or alternatively, an alert is generated to the operator of the craft and/or the operator of the base station.

Figure 8:
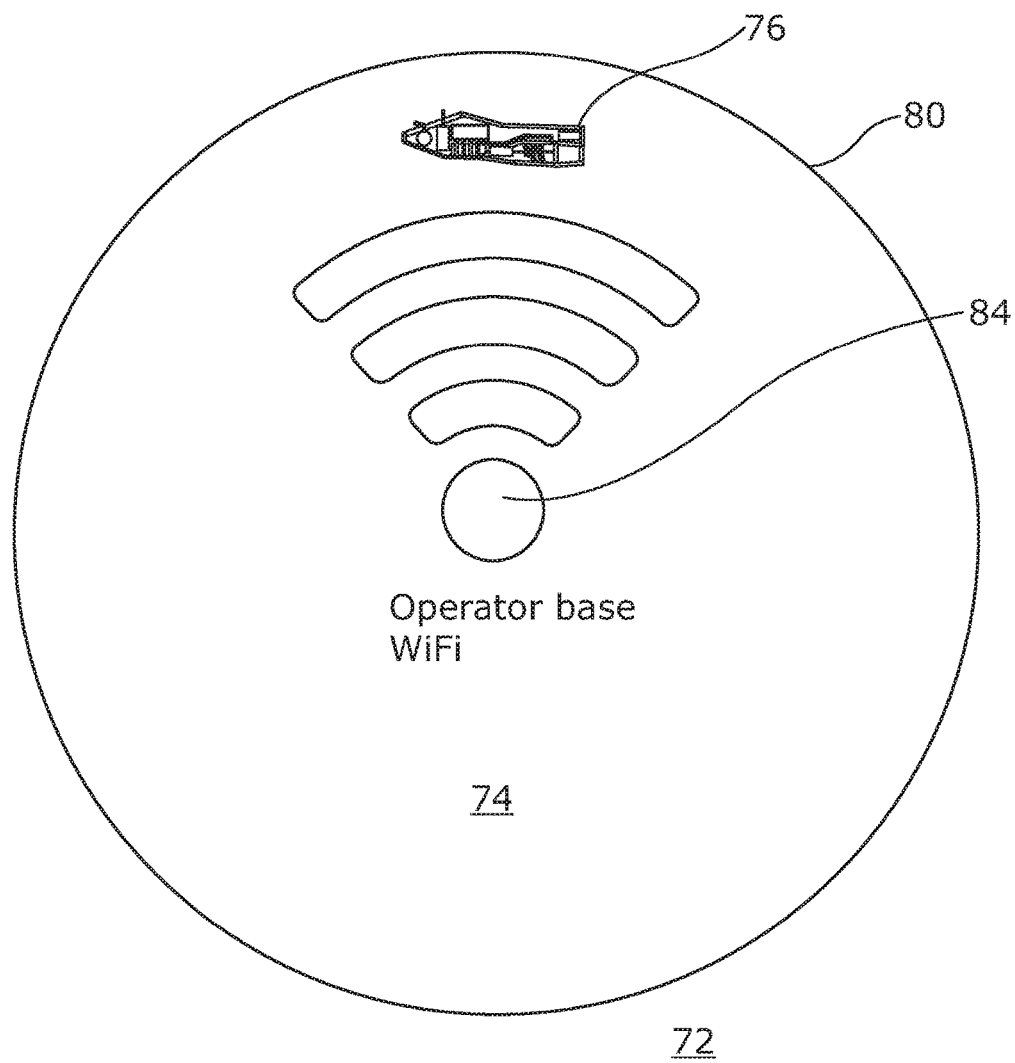
FIG. 8 illustrates a schematic plan view of one embodiment of the invention.

FIG. 8 illustrates a schematic illustration of the invention in which there is illustrated the provision of the base station 84 from which a Wi Fi transmit and receive system is operated which has a range illustrated by the perimeter circle 80. Alternatively each of the craft has a GPS signal emitter and the detected location of the craft is compared to the location within or outside of the perimeter circle constantly or at regular intervals. A craft 76 is shown within the range 80 and hence is operable within the permitted area 74. In this embodiment if the craft goes beyond the perimeter 80 into the area 72, the operator of the craft 76 is alerted by a sounder and/or light and the craft is moved into a mode by the control means thereon, upon detection of this event, such that the craft 76 will only operate in one direction back towards the base station 84, or alternatively the motor of the craft is switched off, or changed to a mode in which only slow movement of the craft is possible.

In one embodiment the craft are able to communicate with each other and this communication can be used as part of a cross check system so that if, for example, an expected signal is not received by the base station from a particular craft 76 then, before the same is deemed to be outside the perimeter 80, a check signal is sent from another craft to see if a response is received from the said craft 76. If it is, then the position of the further craft can be used to try and determine the position of the said craft 76 and decide if the same is in an acceptable location or not.

The system in one invention may also operate a security zone which may be the same as, include part of, or be separate from, the area defined for acceptable operation of the craft.

The security zone may be determined with respect to detected GPS co-ordinates of the craft and/or the trailer used to store and transport the same and/or the detection of the cellular phone location of the operator of the craft and/or trailer. In one embodiment a mobile phone tracking device is provided on the craft and/or trailer and which searches for Wi Fi hotspots and/or phone reception and, when possible, a signal is sent to the base station indicating the location co-ordinates. These co-ordinates can then be compared to acceptable locations and a decision reached as to whether the craft and/or trailer is at an acceptable location.

Figure 9:
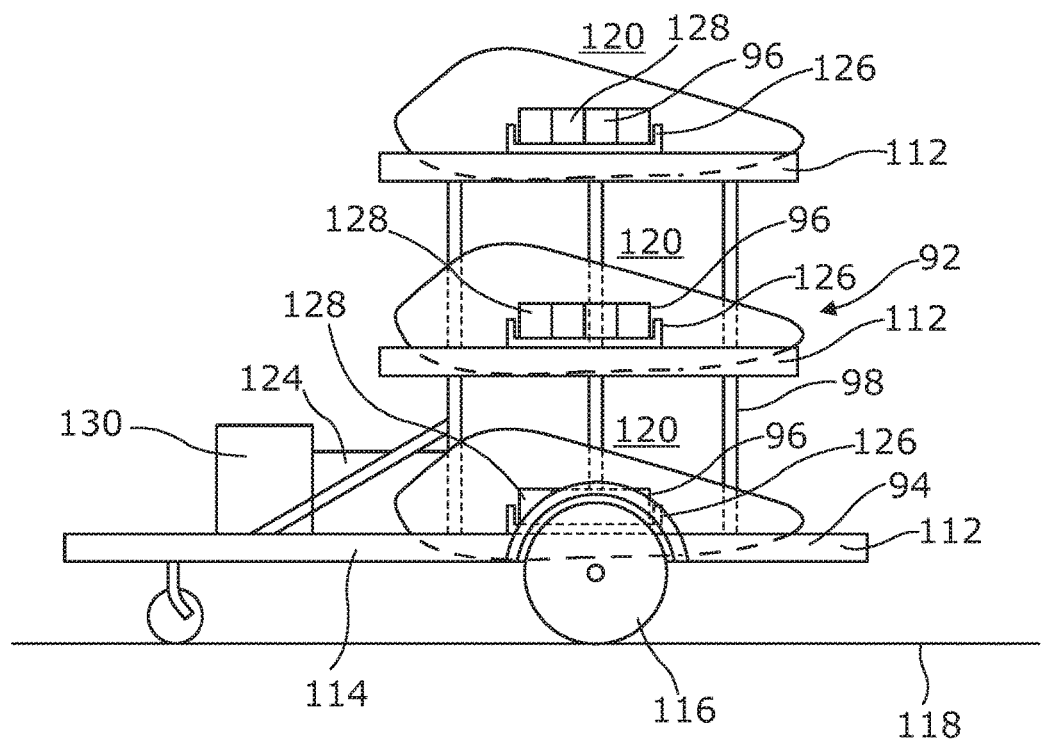
FIG. 9 illustrates a trailer and craft assembly in accordance with one embodiment of the invention.
Figure 10:
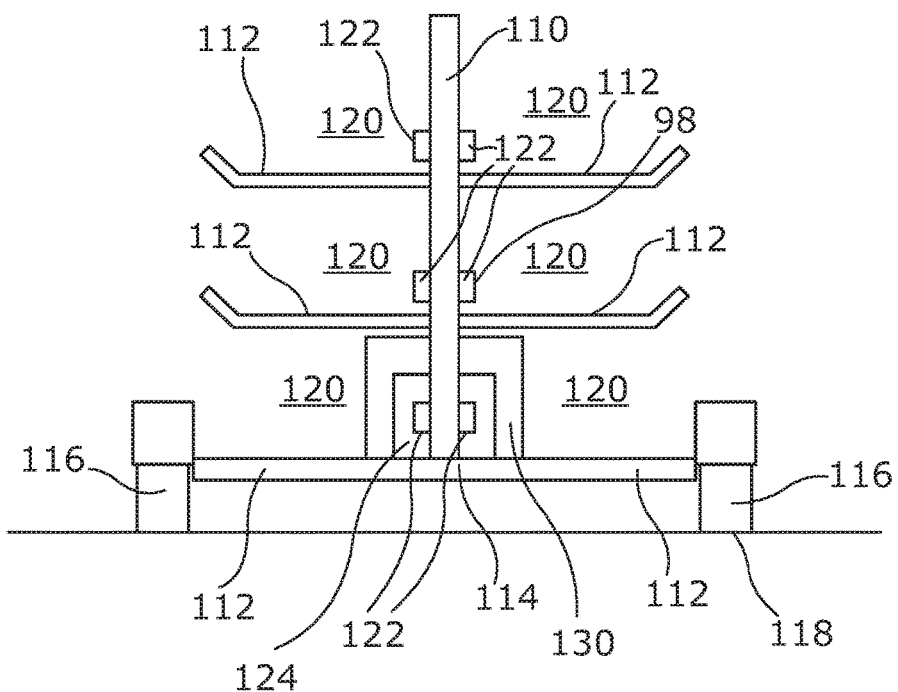
FIG. 10 illustrates a rear view of a trailer in accordance with an embodiment of the invention.

Referring to FIGS. 9 and 10, there is illustrated a craft and trailer assembly 92 in accordance with one embodiment of the invention. The assembly includes a trailer 94 and a number of craft 96, located thereon for transport and storage.

The trailer includes a frame 98 which has a central body portion 110 and from which depend outwardly a number of support arms 112. Pairs or more of the support arms serve to define a location 120 on which the craft can be located as shown. The frame also includes a base portion 114 and mounted thereon is a wheel assembly 116 which allows the trailer to be moved across a surface 118.

In FIG. 10 a rear view of the trailer is shown with the craft removed for ease of illustration. At each of the locations 120 on the frame there is provided data and power connections such as a power and a data socket 122. When the craft is in the location 120, the craft can be connected via suitable connection plugs or cables to the sockets. The power connection allows power to be provided to allow at least limited operation of certain functions of the craft and/or may also allow the charging of batteries provided within the craft. The power may be provided from a power source 124 mounted on the trailer or from a mains power source connected to the trailer.

The data connection allows the transfer of data to and from the craft via the trailer. Typically the data can then be collected by a computer connected to a data socket provided on the trailer, or may be transmitted to a remote location for collection and analysis. In either case, data for the usage for all of the craft will typically be collected and processed to identify any problems with operation and/or ensure that the usage of the craft matches with the financial return from the rental of the craft. In addition, data updates can also be transferred to the craft using the connection.

The frame of the trailer also includes location means 126 for the location of banks of batteries 128. These batteries can be located on the trailer in a charged condition and, in one embodiment, may be charged whilst mounted on the trailer via power charging connections and suitable charging apparatus. The charge may be imparted by connection of the trailer to a mains power source and/or from the main trailer battery pack 124 located on the trailer. The provision of the charged batteries allows these to be used to replace batteries which are in the craft and when they have discharged their power. This thereby ensures that the craft are always provided with powered means to allow continued use of the same.

The trailer can also be provided with a user interface unit 130 which includes the data connection means and, in one embodiment, includes means to allow the use of credit card payment for rental of the craft. The unit may also comprise timing means to determine and indicate when a particular craft has been in use in the water for a predetermined time.

The unit may also include means to emit signals which define a particular range in which the craft are permitted to be operated in the body of water and if the craft go beyond the permitted area to react to that.

It will therefore be appreciated that the current invention provides improvements to operation of a trailer and also allows the trailer to be used for additional functions when not in use for the movement of items mounted thereon.

The invention claimed is:

1. Apparatus in the form of a craft for powered movement with respect to a body of water, said craft including handle means by which a user can grip the craft and be propelled across the body of water thereby, a power supply and at least one fluid inlet and at least one fluid outlet separated by at least one connecting channel and a motor is provided to rotate one or more vanes on a longitudinal shaft positioned in the at least one channel intermediate the said at least one inlet and at least one outlet in order to generate a propelling force for the said craft and wherein the said craft is of a length in the range of 900-1500 mm and as the craft is propelled through the said body of water the user is located on the top surface thereof in a kneeling or laid down position and the said craft is semi-submersible with the front of the craft above the surface of the body of water and the craft gradually enters and moves below the surface of the said body of water towards the rear of the craft.

2. Apparatus according to claim 1 wherein there is provided a first inlet connected to a first outlet at or adjacent to one side of the craft and connected by a channel and a second inlet connected to a second outlet at or adjacent to the opposing side of the craft and connected by a channel and a shaft and vane assembly is provided for each channel to create a propulsion force by moving the water from the inlet to the outlet.

3. Apparatus according to claim 1 wherein the water in which the craft is located acts as a coolant for the motor as the craft is propelled through the body of water.

4. Apparatus according to claim 1 wherein a switch for operation of the power supply is provided and failsafe means are provided in the form of a cord attached to the person which, if the person falls off the craft, causes the switch to be disengaged and/or in the form of switch means on the underside of the craft which will move to an off position to disengage the motor if the same is out of contact with the body of water.

5. Apparatus according to claim 1 wherein one or more deflecting means are provided at the outlet to be pivotably movable between a first position and a second position dependent upon the pressure of the flow of fluid through the outlet and the greater the pressure of the flow of fluid then the more the deflecting means is urged towards the second position to allow the water to be expelled to a greater height with respect to the body of the craft.

6. Apparatus according to claim 1 wherein the craft body includes handle means, a power supply formed by one or more battery packs which are mounted within the body, at least one shaft, at least part of the one or more channels and location detection means to allow the location of the craft on the body of water to be detected.

7. Apparatus according to claim 6 wherein the location detection means are used as part of a system to confine the movement of the craft to a particular geographical area on the body of water.

8. Apparatus according to claim 1 wherein the craft includes means to allow the wireless communication between the craft and the person using the same and/or with persons using other craft and/or with persons at the side of the body of water.

9. Apparatus according to claim 1 wherein the craft operates in conjunction with a control system which includes a base station to which the craft is connected via a wireless local area network (WLAN) to allow communication between the craft and/or base station.

10. Apparatus according to claim 9 wherein the said control system includes predetermined zones and in one embodiment there is provided an operating zone and a security zone.

11. Apparatus according to claim 1 wherein the main jet thrust unit of the craft is powered from an on-board rechargeable battery and the amount of thrust is variable from zero to a pre-set upper limit.

12. Apparatus according to claim 11 wherein the user of the craft interacts with the control system for the craft to selectively use one or more predetermined portions at which the craft can be used at a predefined thrust level within a predetermined session of use of the craft.

13. Apparatus according to claim 12 wherein the said one or more predetermined portions are set by the craft supervisor at the start of the session of use.

14. Apparatus according to claim 1 wherein each craft monitors parameters of the craft usage including battery voltage, motor speed and craft speed and stores data relating to the same into local non-volatile memory and/or transmits the same to base station.

15. Apparatus according to claim 9 wherein location detection data is used to determine if the craft goes outside the operating zone and, if so, an alarm indicator will flash and the propulsion unit will be stopped and will only restart if the craft is progressing back towards the operating zone and/or if the craft is taken out of the security zone the control system will disarm the propulsion and display functions of the craft.

16. Apparatus according to claim 1 wherein the usage of the craft is monitored with respect to a predetermined boundary of use, said apparatus including signal emitting means to emit a signal from the craft, a base station with receiving means to receive said emitted signals, a memory in which the location of the predetermined boundary is stored, and processing means to determine the location of the craft on the basis of the received signals with respect to the boundary and if the determined location is at, adjacent to or beyond the said boundary an alert condition is activated.

17. Apparatus according to claim 16 wherein the determination of the location is such that if an emitted signal is not received within a predefined time period or the strength of the signals received at the base station reduces below a predetermined level, the alert condition is caused.

18. Apparatus according to claim 16 wherein the alert condition is activated if an emitted signal received from the craft is such as to indicate an alert, and has therefore been positively emitted by the operator of the craft, or by the control system of the craft.

19. Apparatus according to claims 16-18 wherein the alert condition includes a visible and/or audible alert being generated at the base station and/or sending an alert signal to a remote monitoring location and/or the owner of the craft and/or one or more persons associated with the operator of the craft at that time and/or the transmission of a signal to the craft control system to change the condition of operation of the same.

20. Apparatus according to claim 16 wherein the craft triggers the alert condition in the absence of any signal from the base station after a predetermined time.

21. Apparatus according to claim 1 wherein the apparatus includes a trailer for the location of one or more of the craft thereon, said trailer including a frame which defines locations at which the craft can be placed and supported, a wheel assembly which allow the trailer to be moved between locations whilst carrying the said craft and wherein the trailer includes at least one power source mounted thereon and for use to power at least one function provided from the trailer.

22. Apparatus according to claim 21 wherein the trailer includes one or more power sources provided to allow functions related to the trailer to be performed and/or to allow power to be provided to the craft located on the trailer.

23. Apparatus according to claim 22 wherein the frame defines location positions for the further power sources thereon include electrical connections for the power sources to allow the same to be charged when they are located on the frame.

24. Apparatus according to claim 22 wherein when the craft are located on the frame they are connected to a power and/or data connection.

25. Apparatus according to claim 22 wherein the trailer is provided with a wireless communication facility in order to allow data communication between the trailer and another location which may be remote from the trailer.

26. Apparatus according to claim 22 wherein the trailer includes a motor which is operable and provided in connection with the wheel assembly to allow the powered movement of the trailer across a surface without the need for the trailer to be connected to a vehicle.

27. Apparatus according to claim 22 wherein the trailer acts as a base station for the monitoring of the usage of the craft by the transmission and/or reception of data to and from the craft whilst the craft are separated from the trailer.

28. Apparatus according to claim 1 wherein the craft includes a means to emit a jet of water therefrom and the jet can be emitted when selected by the user of the craft.

29. Apparatus according to claim 28 wherein the direction in which the jet of water is emitted and/or the power at which the jet of water is emitted is selected and adjustable by the said user.

30. Apparatus according to claim 1 wherein the operation and/or level of power of the jet of water and/or the speed at which the craft can be operated in a session of use is determined with respect to a predetermined power level which is available to the craft for a session of use in order to allow power to still be available for operation of the craft towards the end of the said session.

31. Apparatus according to claim 30 wherein the craft can be operated at at least two different speed levels, with the higher speed level only available for a period of time of said session of use.

32. Apparatus in the form of a craft for powered movement with respect to a body of water, said craft including handle means by which a user can grip the craft and be propelled across the body of water thereby, a power supply and at least one fluid inlet and at least one fluid outlet separated by at least one connecting channel and a motor is provided to rotate one or more vanes on a longitudinal shaft positioned in the at least one channel intermediate the said at least one inlet and at least one outlet in order to generate a propelling force for the said craft and the said craft operates in conjunction with a control system which includes a base station and to which the craft is connected via a wireless local area network (WLAN) to allow communication between the craft and/or base station and wherein location detection data is used to determine if the craft goes outside the operating zone and, if so, an alarm indicator will flash and the propulsion unit will be stopped and will only restart if the craft is progressing back towards the operating zone and/or if the craft is taken out of the security zone the control system will disarm the propulsion and display functions of the craft.

\* \* \* \* \*